J. ONSEL.
SHARPENER FOR LAWN MOWERS.
APPLICATION FILED AUG. 5, 1914.
1,130,624.
Patented Mar. 2, 1915.
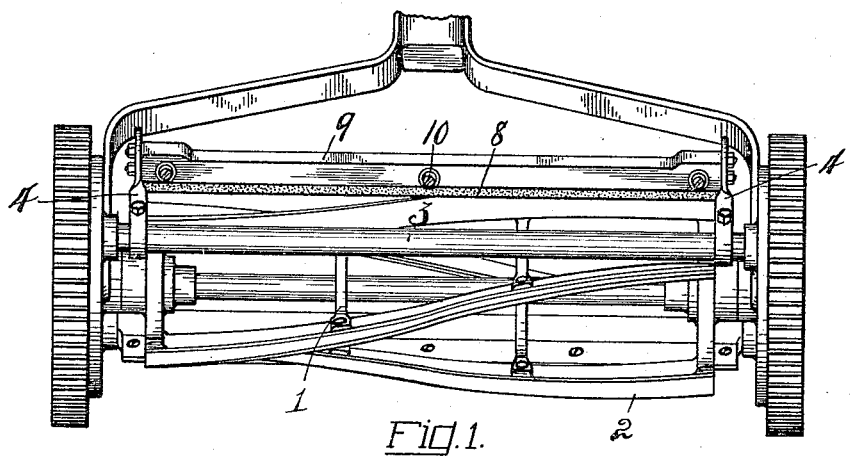
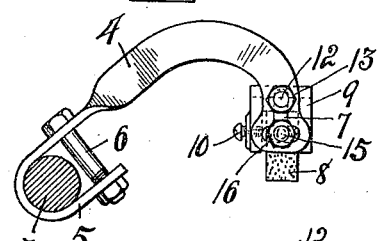
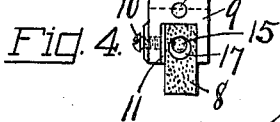
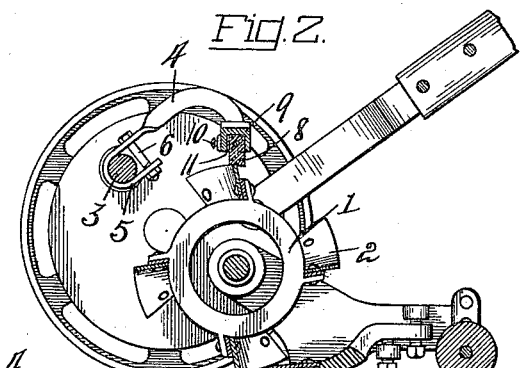
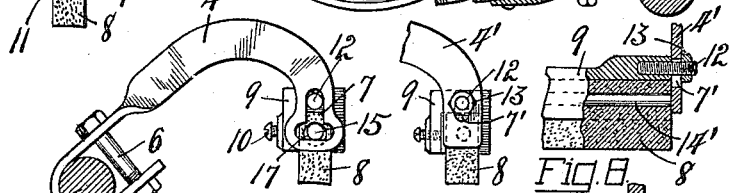
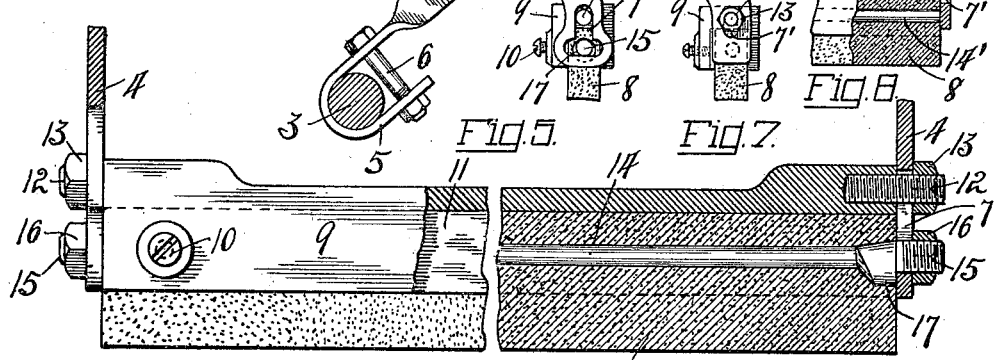
WITNESSES:-
INVENTOR.
John Onsel,
By Owen, Owen & Crampton,
His attys.

UNITED STATES PATENT OFFICE.

JOHN ONSEL, OF RISINGSUN, OHIO.

SHARPENER FOR LAWN-MOWERS.

1,130,624.          Specification of Letters Patent.          Patented Mar. 2, 1915.

Application filed August 5, 1914. Serial No. 855,143.

*To all whom it may concern:*

Be it known that I, JOHN ONSEL, a citizen of the United States, and a resident of Risingsun, in the county of Wood and State of Ohio, have invented a certain new and useful Sharpener for Lawn-Mowers; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to automatic sharpening means for lawn mower knives, and has for its object the provision of an improved sharpening means of this character, which is simple and inexpensive in its construction, composed of a minimum of parts, and capable of being easily and quickly applied to a lawn mower and adjusted to suit the knives, thus enhancing the practicability and commercial value thereof.

The invention is fully described in the following specification, and while, in its broader aspect, it is capable of embodiment in numerous forms, a preferred and one modified form thereof are illustrated in the accompanying drawings, in which,—

Figures 1 and 2 are front and cross-sectional views respectively of a lawn mower equipped with my invention, Fig. 3 is an enlarged outer end detail of the invention, Fig. 4 is an end view of a sharpening stone and its holder, Fig. 5 is an outer end view similar to Fig. 3 with the binding nuts removed from the stone holding parts, Fig. 6 is an enlarged rear elevation of a grinding stone, its holder and carrying arms, with parts in section and broken away, and Figs. 7 and 8 are end and side details, with the latter partly in section, of a modified form of the invention.

Referring to the drawings, 1 designates the cutter wheel of a lawn mower, which wheel is provided with a plurality of knives 2.

3 designates the customary cross or guard-bar of a mower such bar being common to most makes of lawn mowers. Removably carried by and projecting upward and rearward from the guard-bar 3 for revoluble adjustment therearound are a pair of arms 4, one being located adjacent to each end of the bar. The forward ends of these arms are looped in U-shape, as at 5, to adapt them to engage over the bar 3, and the leg portions of such U-shape part are intended to be contracted by a connecting bolt 6 to effect a rigid clamping of the arm end to the bar 3. The arms 4 are preferably made of strap metal, and the free end portion of each is preferably given a quarter turn without the U-shape part 5 thereof to place the flat sides of such free end portion in vertical planes, as shown. The vertically flattened portion of each arm 4 preferably extends upward, rearward and downward on a curve from the U-shape portion 5 thereof, with the free end thereof terminating in substantially vertical position and provided with a slot 7 which, in the present instance, is of inverted T form.

The grinding medium comprises a stone-like bar 8 of any suitable grinding composition or it may comprise a natural grinding stone, as desired, such bar being of a length substantially equal to the length of the knives 2 of the mower. The sharpening bar 8 is carried by and has its upper edge portion projected into the bottom channel of a holder-bar or member 9 being secured therein by a plurality of set-screws 10, which thread through one wall of the channel portion of the member and preferably have their inner ends thrust directly against a metal plate 11, which in turn has its thrust against the sharpening bar 8. It is found in practice that the jar of the lawn mower, when being operated, will loosen the engagement of set-screws with the grinding stone and that the insertion of a thin plate 11 between the set-screws and the stone will provide a more efficient and lasting gripping means than if the set-screws have direct contact with the stone. The ends of the holder-bar channel are open so as to completely expose the ends of the stone.

Projecting from each end of the holder bar 9 above its channel and lengthwise thereof is a threaded stud 12, which is intended to project through the slot 7 of the respective arm 4 and to receive a nut 13 at its outer end for effecting a firm clamping of the arm 4 in properly adjusted position to the end of the holder.

It is preferable when making the stone 8 to provide the same lengthwise thereof with an internal reinforcing bar 14 the ends of which are projected beyond the ends of the stone and threaded, as at 15, to extend through the lower transversely broadened portion of the arm slot 7 to receive a binding nut 16, whereby the ends of the arms 4 have a firm clamping action against the respective ends of the stone. As the clamping of the metal arms 4 directly to the material forming the stone 8 would not be of a very lasting or permanent nature due to the crumbling tendency of the stone, the bar 14 is provided at each end thereof in substantially flush relation to the end of the stone with a shoulder 17 against which the arm may be clamped, thus providing a metal to metal clamping of the parts. It is evident that the bar 14 performs a dual function namely of reinforcing the stone and of assisting in firmly securing the arms to the stone, which securing means augments the clamping action of the set-screws 10, which alone are customarily used in sharpening devices of this nature. The broadening of the lower portion of the slot 7 of each arm enables the holder 9 and its stone to have a swinging action relative to the arms 4, with the studs 10 as the swinging axis whereby to facilitate an adjusting of the stone to suit the knives.

In the modified form shown in Figs. 7 and 8, the stone reinforcing bar, which is designated 14' therein, terminates substantially flush with the ends of the stone, and the free end portions of the holder carrying arms, which are designated 4', are intended to have binding contact with the respective ends of the bars, the tightening of the arms against the bars alone being effected by the nuts 13 of the holder studs 12. The slots 7' of the arms through which the studs 12 project are vertically elongated to facilitate a relative adjustment of the stone holder and arms.

It is evident that I have provided a simple and efficient sharpening device, the stone holding member of which is carried at each end thereof by a single-piece arm, which is clamped for revoluble adjustment to the guard bar 3 of the lawn mower, and that the stone holding member is carried by said arms for adjustment in a simple and efficient manner, thus making it easy to apply the device to a lawn mower and to adjust it to suit the knives. It is also evident that the clamping of the arms against the ends of the stone or against metal parts carried by the stone provides an efficient and secure clamping means for the stone thereby enhancing the practicability and commercial value of apparatus of this character.

Having thus described my invention, what I claim as new, and desire to secure by Letters Patent, is,—

1. In combination, a grinding stone of bar-like form, a holder member for said stone having studs projecting from its ends, carrying arms having apertures for receiving said studs, and means coöperating with said studs to secure the arms to said holder member and to cause the arms to have a binding action against the ends of the stone.

2. In combination, a channel bar, a grinding stone carried thereby with its ends exposed at the ends of said bar, and carrying arms adjustably secured to the ends of said bar and having clamping action against the ends of the stone.

3. A sharpening device of the character described having a sharpening stone provided with metallic end portions, carrying arms for said stone and means for causing said arms to have frictional binding contact with the metallic end portions of the stone.

4. In a device of the character described, a bar-like grinding stone, a reinforcing member embedded in said stone and exposed at the ends thereof, carrying arms for said stone, and means for frictionally clamping the arms in adjusted relation to the exposed end portion of said reinforcing member.

5. In combination, a bar-like grinding stone, reinforcing means embedded in the stone and having parts projecting from the ends thereof, carrying arms having apertures for receiving said parts, and means for co-acting with said parts to frictionally clamp the arms to the stone.

6. In combination, a holder member having a channel with its ends open, a grinding stone mounted in and projecting transversely from said channel, means for securing the stone in said channel, studs projecting from the ends of each said holder member and stone, carrying arms slotted to receive said studs, and means coöperating with said studs to adjustably clamp the arms to said member and stone.

7. In combination, a channeled stone holding member, a pair of member carrying arms, a grinding stone carried by said member, and means for adjustably clamping the free ends of the arms to said member and holding the stone in predetermined adjustment.

In testimony whereof, I have hereunto signed my name to this specification in the presence of two subscribing witnesses.

JOHN ONSEL.

Witnesses:
E. E. THOMAS,
M. H. MAYERS.